United States Patent
Ishigaki et al.

(10) Patent No.: US 7,138,786 B2
(45) Date of Patent: Nov. 21, 2006

(54) POWER SUPPLY DRIVER CIRCUIT

(75) Inventors: Takuya Ishigaki, Hitachi (JP); Takashi Sase, Hitachi (JP); Akihiko Kanouda, Hitachinaka (JP); Koji Tateno, Takasaki (JP); Ryotaro Kudo, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/287,293

(22) Filed: Nov. 28, 2005

(65) Prior Publication Data
US 2006/0113979 A1  Jun. 1, 2006

(30) Foreign Application Priority Data
Nov. 29, 2004 (JP) ............................. 2004-344037

(51) Int. Cl.
*G05F 1/613* (2006.01)
(52) U.S. Cl. .................................... 323/224
(58) Field of Classification Search ............. 323/224, 323/283, 284, 285, 293
See application file for complete search history.

(56) References Cited

U.S. PATENT DOCUMENTS
5,801,935 A * 9/1998 Sugden et al. ................ 363/89

FOREIGN PATENT DOCUMENTS
JP    2003-232816    8/2003

* cited by examiner

*Primary Examiner*—Shawn Riley
(74) *Attorney, Agent, or Firm*—Antonelli, Terry, Stout and Kraus, LLP.

(57) ABSTRACT

A power supply driver circuit with low power losses and desired response characteristics with respect to changes in output and its miniaturization is provided. In a driver IC constituting a switched-mode power supply equipment controlling the switching, by pulse width modulation, of first and second power transistors passing a current in a coil, and outputting a voltage bucked or boosted from an input voltage, current sensing with desired responsiveness is enabled by providing a switching transistor between an inverted input terminal and a non-inverted input terminal of an operational amplifier, preventing, while the second power transistor is ON, the generation of a potential which is undefined when first power transistor is ON, i.e. when the second power transistor is OFF, and maintaining a node potential in a state in which the potential is well defined.

11 Claims, 12 Drawing Sheets

POWER SUPPLY DRIVER CIRCUIT

BACKGROUND OF THE INVENTION

1. Field of the Invention

The present invention pertains to current sensing of a piece of power supply equipment generating direct-current voltage, and in particular, to technology valid for improving the current sensing accuracy in a power supply driver circuit driving a power transistor by means of switching control.

The power supply driver circuit of the present invention is suited to a power supply driver circuit driving the power transistors of a piece of switched-mode power supply equipment controlling switching, e.g. with the PWM (Pulse Width Modulation) method, converting an input voltage, and obtaining an output voltage, and to a driver module equipped with the circuit, as well as to a switched-mode power supply utilizing the module.

2. Description of the Related Art

When it comes to electronic equipment in recent years, articles equipped with a microprocessor (below called CPU, Central Processing Unit) as a system control device have become more frequent. Also, there is a trend that the operating frequency of CPUs is becoming higher and higher, the increase in operating frequency being accompanied by an increase in maximum operating current.

Accordingly, in order to respond to the demand for these large currents, multi-phase systems which raise the current supply capacity by connecting multiple switching power supplies in parallel are being proposed.

In this kind of power supply systems, it is necessary to sense the current flowing in the coil and to control by feedback the drive signal of the power transistor of each phase so that a uniform current is flowing for each power supply (phase).

Because the current of each phase is uniformly controlled in the current sensing for feedback control, a relatively high accuracy is required.

As a method for sensing currents with high accuracy in power supply systems of this kind, there is e.g. the method set out in JP-A-2003-232816.

SUMMARY OF THE INVENTION

However, with current sensing technology based on power supply systems such as mentioned above, the following problem areas were found to exist by the inventors.

Specifically, the aforementioned JP-A-2003-232816 does not take into account the case of using it with a switched-mode power supply and does not touch upon the response of the sensed current. As a result, when the power transistors of the switched-mode power supply switch, there ends up occurring a response delay, so there is the problem that it becomes difficult to sense an accurate value for the current.

It is an object of the present invention to provide technology making it possible to sense a current with high accuracy, even rapidly after switching, without being subject to the influence of the switching of the power transistors, and based on that, enabling current control with high accuracy and high speed.

As for the above and further objects, and novel characteristics, of the present invention, they should become obvious from the description of the present specification and the accompanying drawings.

A summary of a representative aspect of the invention disclosed in the present application will be briefly described as follows.

According to the present invention there is provided a power supply driver circuit which constitutes a piece of switched-mode power supply equipment controlling, by the PWM (Pulse Width Modulation) method, the switching of a power semiconductor device passing a current in an inductor and outputting a voltage converted from an input voltage, the driver circuit comprising a current sensing semiconductor device, wherein the drain terminals of same and said power semiconductor device and, or their collector terminals, are joined together, the same drive voltage being applied to their control terminals; a current sensing resistor to which is connected the source terminal or emitter terminal of the concerned current sensing semiconductor device; an operational amplifier circuit, a first input terminal of which is connected to a first node, which is a connection node connecting the concerned current sensing resistor and the concerned current sensing semiconductor device, and to a second terminal of which is applied a voltage of the same potential as the source voltage or emitter voltage of the concerned power semiconductor device; and a current sensing circuit in which a feedback loop is formed in such a way that the pair of input terminals of the concerned operational amplifier circuit have the same potential, and making output the signal arising in the current sensing resistor as a current sensing signal; wherein the driver circuit is a circuit which makes an undefined potential well defined by ensuring the route along which the current flows in the current sensing circuit, regardless of the switching state.

Also, the contents of the invention of the present application will be described more specifically as follows.

According to the present invention there is provided a power supply driver circuit constituting a piece of switched-mode power supply equipment controlling, by the PWM method, the switching of power transistors passing a current in a coil acting as an inductor, converting (boosting or bucking) an input voltage to obtain an output voltage, wherein the circuit is formed so as to maintain the node potential of the current sensing operating state, even at times when the node potential of the current sensing circuit is undefined.

For example, the invention is implemented by means of switching-based grounding of the inverted input terminal voltage of an operational amplifier, or potential holding of the gate potential of an output MOS (Metal Oxide Semiconductor) transistor internal to the operational amplifier, based on a diode and switch series circuit.

According to the aforementioned technology, since the node voltage is set to the potential for the current sensing operating state and because it becomes possible to selectively set the potential in the node where the voltage becomes undefined or the node in which a surge voltage is generated, a shift in the node potential does not occur as has conventionally been the case, so it becomes possible to improve the accuracy and response of the sensed currents to the output current of the switched-mode power supply equipment, the power supply driver circuit, and the module.

The effects to be obtained by representative aspects of the invention disclosed in the present application will be briefly described as follows.

(1) By suppressing the influence of an undefined voltage state due to the switching of a power supply driver, it becomes possible to improve the response of the current sensing with respect to the output current as well as to raise the current sensing accuracy independently of the timing of the current sensing.

(2) By the aspect (1) above, it becomes possible to implement a switched-mode power supply equipment capable of highly accurate current control as well as a preferable power supply driver circuit and module.

Other objects, features and advantages of the invention will become apparent from the following description of the embodiments of the invention taken in conjunction with the accompanying drawings.

DESCRIPTION OF THE EMBODIMENTS

Hereinafter, the embodiments of the present invention will be described in detail on the basis of the drawings. Further, in all the figures for explaining the embodiments, like reference numerals are as a rule attached to like parts, and repeated explanation of them will be omitted.

1. Embodiment 1

Figure 1:
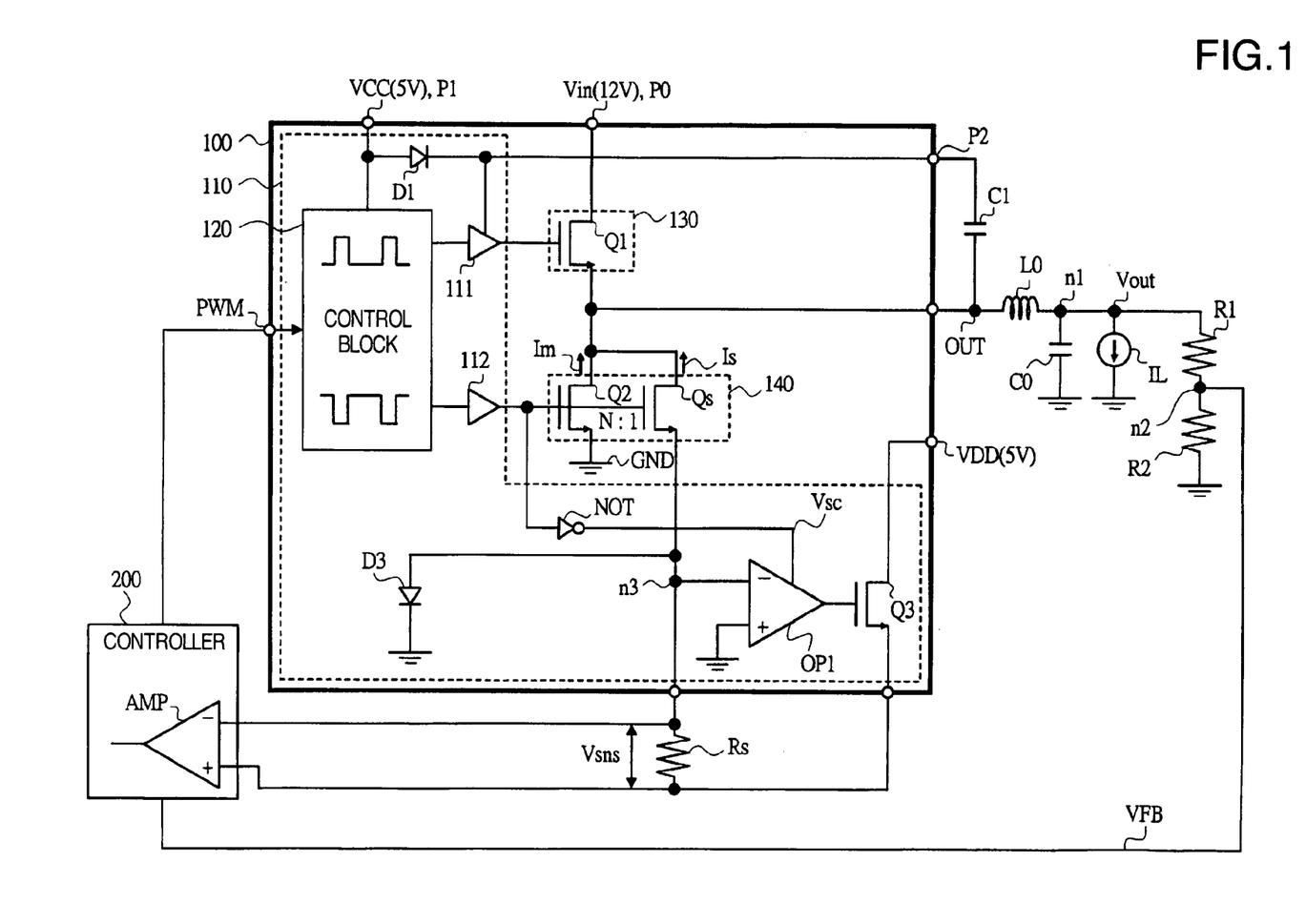
FIG. 1 is a circuit diagram showing an example of a switching regulator according to Embodiment 1 of the present invention.
Figure 2:
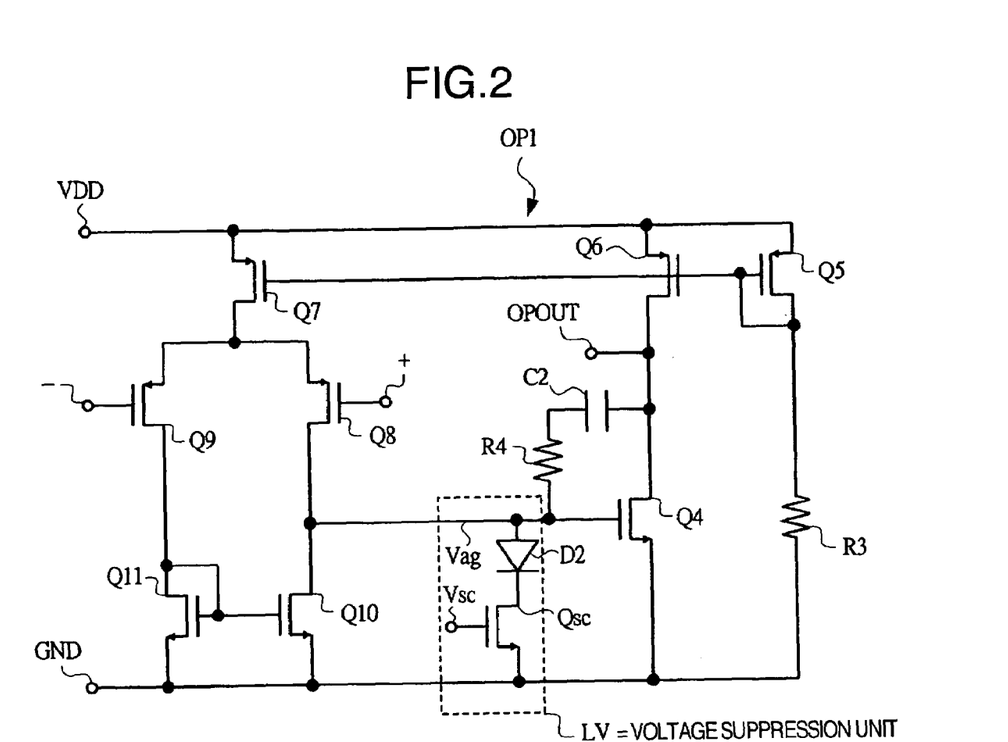
FIG. 2 is a circuit diagram showing an example of an operational amplifier provided in the switching regulator of FIG. 1.
Figure 3:
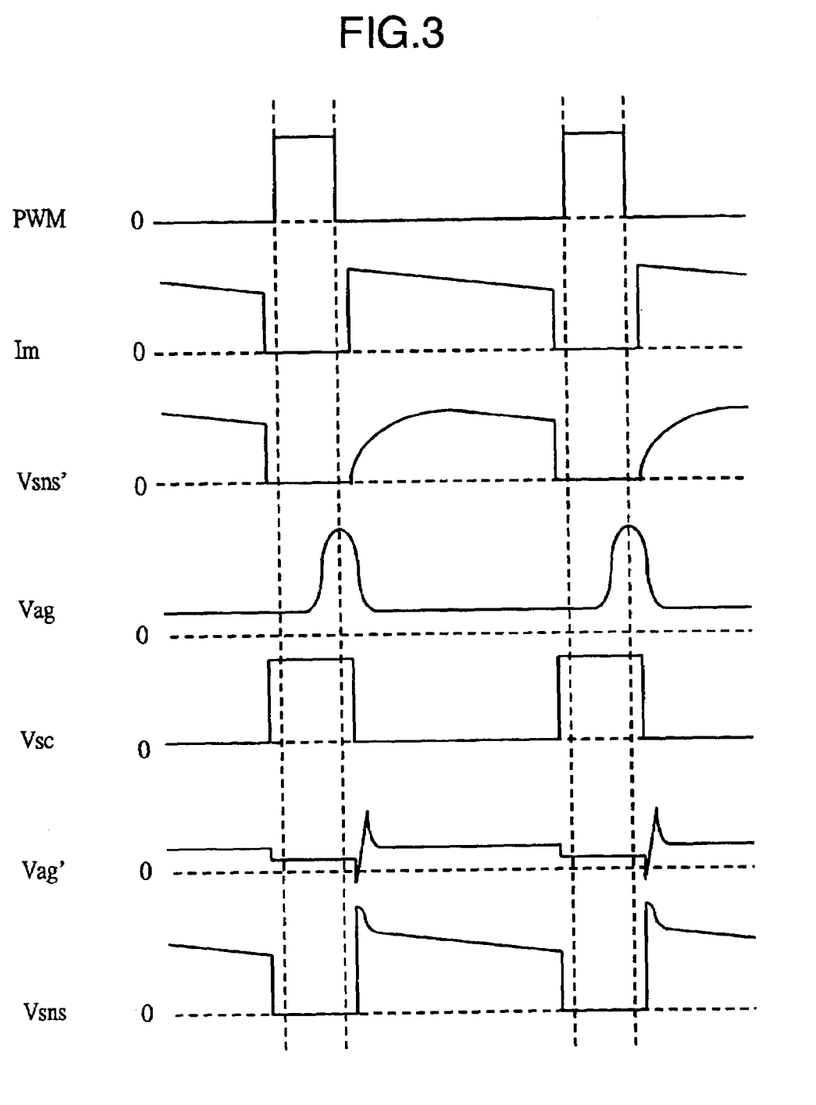
FIG. 3 is a timing chart showing the timing of the signals, for each of its parts, of the switching regulator of FIG. 1.

FIG. 1 is a circuit diagram of an example of a switching regulator based on Embodiment 1 of the present invention, FIG. 2 is a circuit diagram of an example of an operational amplifier provided in the switching regulator of FIG. 1, and FIG. 3 is a timing chart showing the timing of the signals, for each of its parts, of the switching regulator of FIG. 1.

In Embodiment 1, the switching regulator (the power supply driver circuit) comprised of a buck-type regulator and is composed, as shown in FIG. 1, of a power supply driver module 100, a controller 200, a coil L0, a smoothing capacitor C0, resistors R1, R2, a sensing resistor (a current sensing resistor) Rs, and so forth.

Coil L0 is an inductor connected between output terminal OUT of module 100 and a load. Smoothing capacitor C0 is connected between a node n1 and a ground point on the load side of coil L0 and stabilizes an output voltage Vout.

Resistors R1, R2 are connected in series between smoothing capacitor C0 and the ground point (reference potential: GND) and are output voltage sensing resistors.

Sensing resistor Rs is a current sensing resistor and is connected in series to a transistor Qs (a current sensing element) to be subsequently described. Controller (a PWM control circuit) 200 generates a PWM control pulse PWM based on a potential VFB of a connection node n2 of resistors R1, R2, and supplies the control pulse to a driver IC (Integrated Circuit) 110.

Driver module 100 includes a driver IC 110, a high-side power IC 130, and a low-side power IC 140.

A high-side power IC 130 includes a transistor Q1 (a power semiconductor device). Transistor Q1 is a high-side transistor and is formed of for example, a power MOS (Metal Oxide Semiconductor) transistor.

A low-side power IC 140 includes a transistor Q2 (a power semiconductor device) and a sensing transistor Qs. Transistor Q2 is a low-side transistor and is formed of a power MOS transistor. Transistors Q1, Q2 are connected in series between a voltage input terminal P0, to which is input a direct-current voltage Vin supplied from a direct-current power supply such as a battery, and a ground point.

A driver IC 110 comprises a gate drive circuit 111, a gate drive circuit 112, a control logic 120, an inverter circuit NOT (a current sensing circuit), a diode D3 (a current sensing circuit), an operational amplifier OP1 (an operational amplifier circuit and a current sensing circuit) and a biasing MOS transistor Q3 (a current sensing circuit). The driver IC 110 drives gate terminals of transistors Q1, Q2.

The gate drive circuit 111 generates a gate drive voltage of transistor Q1. The gate drive circuit 112 generates a gate drive voltage of transistor Q2. The control logic 120 generates input signals for gate drive circuits 111, 112 having dead times so that transistor Q1 and transistor Q2 are simultaneously not turned in an ON state to prevent a through current, and the transistors Q, and Q are turned ON and OFF in complementary fashion, based on PWM control pulse PWM from controller 200.

A sensing transistor Qs is a current sensing MOS transistor which is connected in parallel to transistor Q2 and is applied with a voltage identical to that of the gate drive voltage of the concerned transistor Q2. Transistor Q3 is a bias MOS transistor and is connected between the other end of sensing resistor Rs and a power supply voltage VDD.

An inverted (−) input terminal of operational amplifier OP1 is connected to connection node n3 of sensing transistor Qs and sensing resistor Rs. And then, operational amplifier OP1 senses the voltage between the terminals of sensing resistor Rs, a voltage Vsns across the two terminals of sensing resistor Rs being applied to a differential amplifier AMP in the controller 200.

Further, a non-inverted (+) input terminal of operational amplifier OP1 is connected to the ground point and the output of this operational amplifier OP1 is applied to a gate terminal of transistor Q3. Node n3 is clamped by means of diode D3.

Moreover, the circuit shown as a current source IL in FIG. 1 is a semiconductor integrated circuit serving as a load of a CPU or the like operating by the supply of current from a switching regulator of the present embodiment.

In driver IC 110, there is provided an external power supply terminal P1 for applying a power supply voltage VCC, there is connected a diode D1 between the power supply terminals of the external power supply terminal P1 and the gate drive circuit 111 generating the gate drive voltage of transistor Q1, and there is as well provided an external power supply terminal P2 connected to a cathode terminal (the power supply terminal of gate drive circuit 111) of the concerned diode D1, and, by having capacitance element C1 connected between the concerned external terminal P2 and module output terminal OUT, there is constituted a bootstrap circuit in which diode D1 and capacitance element C1 boost the power supply voltage of gate drive circuit 111.

In control logic 120 within driver IC 110, there is generated, based on the PWM pulse PWM supplied from controller 200, gate control signals input to gate drive circuit 111 and gate control circuit 112, respectively.

At this point, if the high-level time periods overlap due to a variance of the delay times of the gate control voltages, a through current flows in transistors Q1, Q2. In the control logic 120 for avoiding this, there are shaped gate control signals input respectively to gate drive circuit 111 and gate drive circuit 112 so as to avoid that the high-level time periods of the gate drive voltages of transistors Q1, Q2 overlap.

By means of these gate drive circuits 111, 112, transistors Q1 and Q2 operate ON and OFF in complementary fashion in response to the pulse width of the input PWM control pulse PWM and a current is passed in coil L0, so a voltage Vout corresponding to the duty ratio of the PWM control pulse is output.

As mentioned above, by connecting operational amplifier OP1, the potential of the source terminal of sensing transistor Qs is forced to the same potential as the potential (here, the ground potential GND) applied to the source terminal of transistor Q2.

Transistor Q2 and sensing transistor Qs are composed of one IC, as mentioned above, and are formed with the same processes on the same semiconductor chip so as to have a prescribed element size (gate width or number of elements) ratio (N:1), in addition to which the same voltage as the gate drive voltage of transistor Q2 is applied to the gate terminal of sensing transistor Qs.

As a result, the gate bias states of transistor Q2 and sensing transistor Qs become the same, so that there flows into sensing transistor Qs a drain current Is (=Im/N) which is accurately scaled down proportionally by [a factor] 1/N from the drain current Im of transistor Q2, making highly accurate sensing possible.

Here, if the voltage across the terminals of sensing resistor Rs is taken to be a voltage Vsns, voltage Vsns can be expressed, by using drain current Im of transistor Q2, the size ratio N of transistor Q2 and sensing transistor Qs, and the resistance value rs of sensing resistor Rs, as shown by the following equation:

$$Vsns = Is \times rs = (Im/N) \times rs.$$

FIG. 2 is a circuit diagram showing the internal configuration of operational amplifier OP1 of FIG. 1.

Operational amplifier OP1 is composed of transistors Q4 to Q11, a voltage suppression unit LV, and resistors R3, R4. Voltage suppression unit LV is composed of a switching transistor Qsc (a first switch) and a diode D2 (a voltage down element).

Operational amplifier OP1 has an amplifier output MOS transistor Q4 disposed between an output terminal OPOUT of the concerned operational amplifier OP1 and ground point GND, and has diode D2 and switching transistor Qsc provided in series between the gate terminal of the concerned transistor Q4 and the ground point.

Further, between the gate of switching transistor Qsc and the gate of transistor Q2, there is provided an inverter circuit NOT, so the gate voltage of transistor Q2 and a gate voltage Vsc of switching transistor Qsc are in reverse phase.

If the waveform of this gate voltage Vsc is of the same waveform as the transistor Q2 drive voltage waveform, the same effect is obtained. For example, it is possible to connect the voltage Vsc to a node inside control logic 120 or a node inside gate drive circuits 111, 112.

FIG. 3 is a timing chart showing the signal waveform of each part in the switching regulator.

As against the current Im flowing in transistor Q2, in the case of using an ordinary operational amplifier in which diode D2 and switching transistor Qsc of operational amplifier OP1 are not provided, the rise for sensing voltage Vsns' becomes blunted and the response time is delayed.

This is because during the period during which transistor Q1 is ON, transistor Q2 is OFF, so the potential at inverted input terminal n3 of operational amplifier OP1 is put in an undefined state to generate a voltage thereat.

Next, currents flowing in transistor Q9 and transistor Q11 decrease due to the generated voltage and the currents equal to the decrease amount flows into transistors Q8, Q10. Consequently, since the gate voltage Vag of transistor Q4, that is, an amplifier output MOS transistor, bursts out, the sensing current reaction with respect to the output current ends up getting delayed.

In order to avoid this problem, it is possible, by providing diode D2 and switch transistor Qsc as mentioned above and by maintaining gate voltage Vag of transistor Q4 at the same potential as that of transistor Q2 when it is in the ON state by connecting diode D2 in parallel with transistor Q10 at the timing at which the potential of node n3 becomes undefined, specifically at the timing at which transistor Q1 is ON, to suppress the voltage generated at gate voltage Vag of transistor Q4, so the gate voltage of transistor Q4 becomes like Vag'.

According to Embodiment 1, it thereby becomes possible to suppress, with desired timing, the voltage generated at gate voltage Vag of transistor Q4, so rapidly timed sensing becomes possible with respect to the current Im flowing in transistor Q2 without the rise of sensing voltage Vsns getting dulled, also making it possible to improve the sensing accuracy temporally.

Further, as for diode D2 used in order to suppress the voltage, it is also possible to use an appropriately valued resistance or transistor.

2. Embodiment 2

Figure 4:
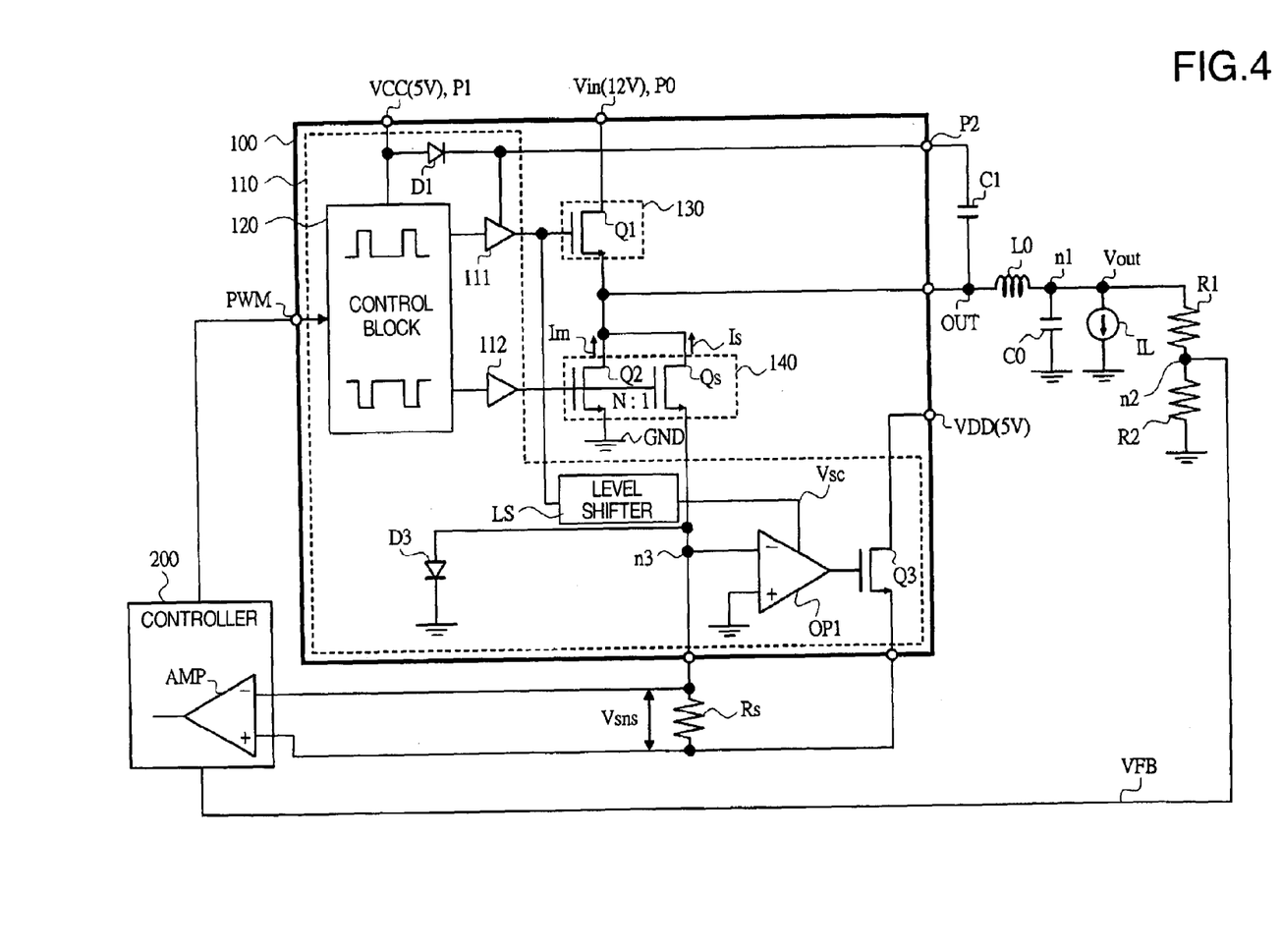
FIG. 4 is a circuit diagram showing an example of a switching regulator according to Embodiment 2 of the present invention.
Figure 5:
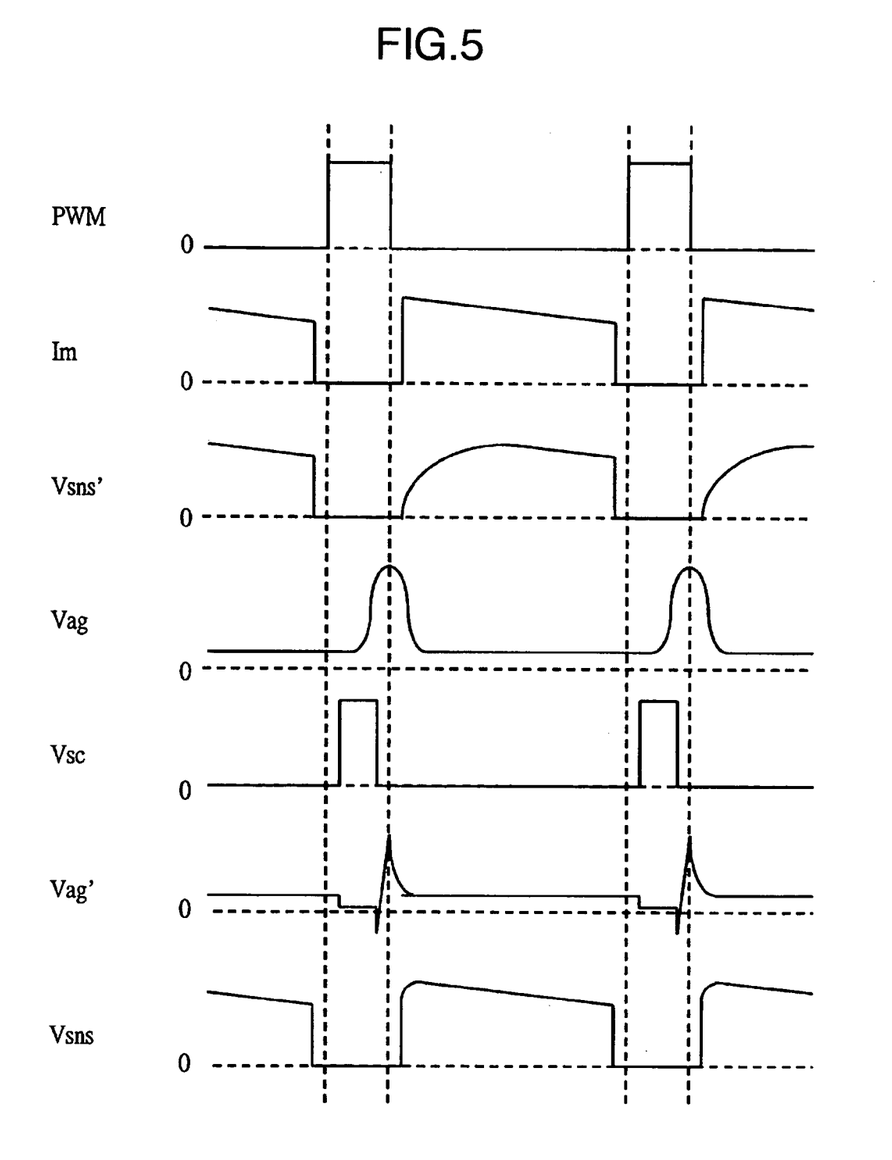
FIG. 5 is a timing chart showing the timing of the signals, for each of its parts, of the switching regulator of FIG. 4.

FIG. 4 is a circuit diagram showing an example of a switching regulator according to Embodiment 2 of the present invention and FIG. 5 is a timing chart showing the timing of the signals, for each of its parts, of the switching regulator of FIG. 4.

In Embodiment 2, FIG. 4 is a circuit diagram showing another example of a power supply driver module, equipped with a power supply driver circuit relating to the present invention, and a buck-type switching regulator applying same, and FIG. 5 shows its timing chart.

Embodiment 2 has a configuration wherein a level shifter circuit LS is provided between the gate of transistor Q1 and operational amplifier OP1 and is input to the gate of switching transistor Qsc, in the circuit in FIG. 1 of the Embodiment 1, in which an inverter circuit NOT is provided between the gate of transistor Q2 and operational amplifier OP1, and the output of which is input as gate voltage Vsc to the switch of diode D2.

The gate voltage of transistor Q1 and the gate voltage of transistor Q2 switch interchangeably, but in order to avoid their respectively being simultaneously in the ON state, a dead time is set on both the high side and the low side when the ON states switch.

Because of that, by level shifting the gate signal waveform of transistor Q1, that is converting the signal between e.g. 0V and 5V, rather than using the inverted signal waveform of the gate voltage of transistor Q2 as gate voltage Vsc, it is possible to input a short signal during the ON time period as the switch signal of the voltage suppression circuit rather than considering the short signal as the inverted signal waveform of the gate voltage of transistor Q2.

Embodiment 2 is advantageous in that the time period during which the voltage is suppressed becomes shorter than in the Embodiment 1, which is valid in case the undefined voltage is small, in case the time period during which voltage is generated is short, or the like.

3. Embodiment 3

Figure 6:
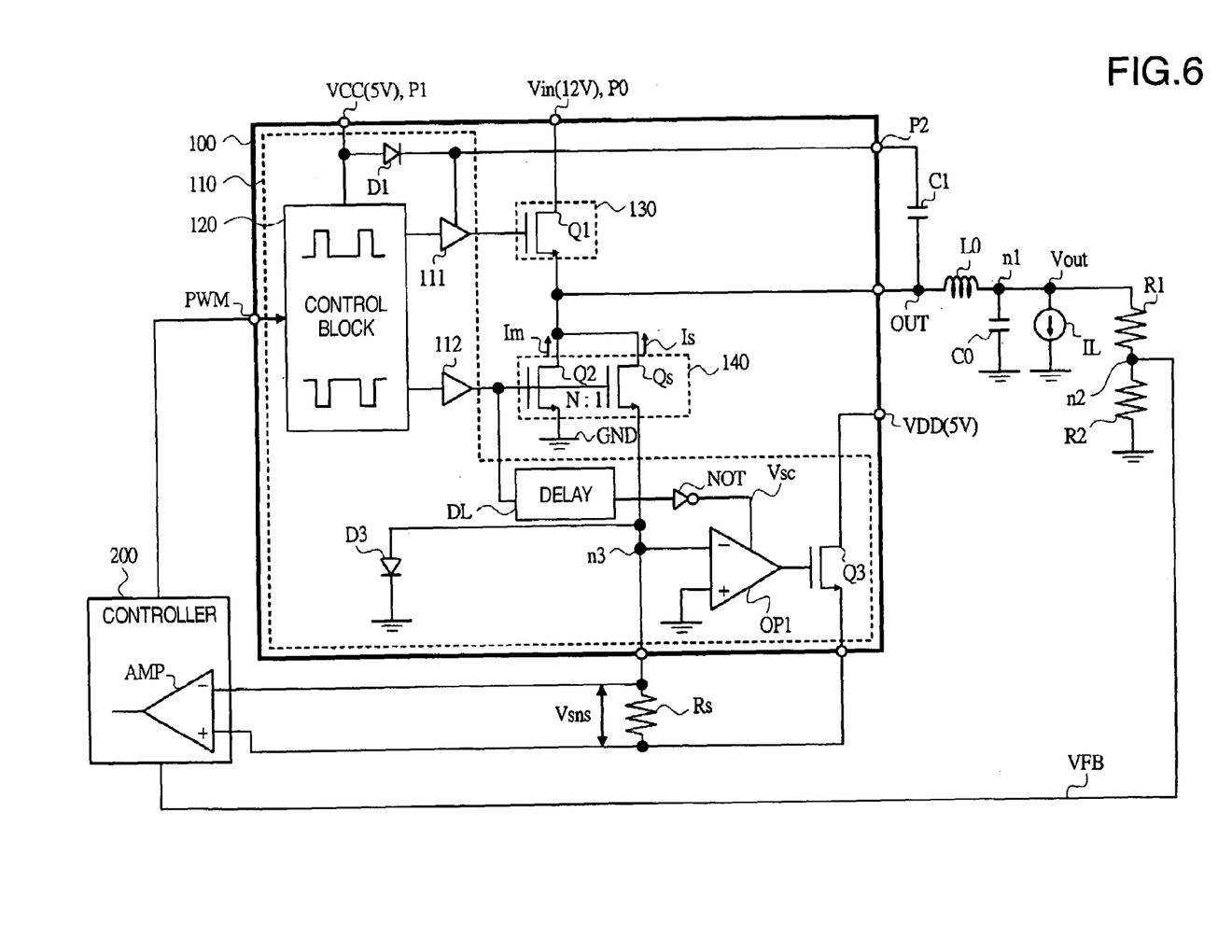
FIG. 6 is a circuit diagram showing an example of a switching regulator according to Embodiment 3 of the present invention.
Figure 7:
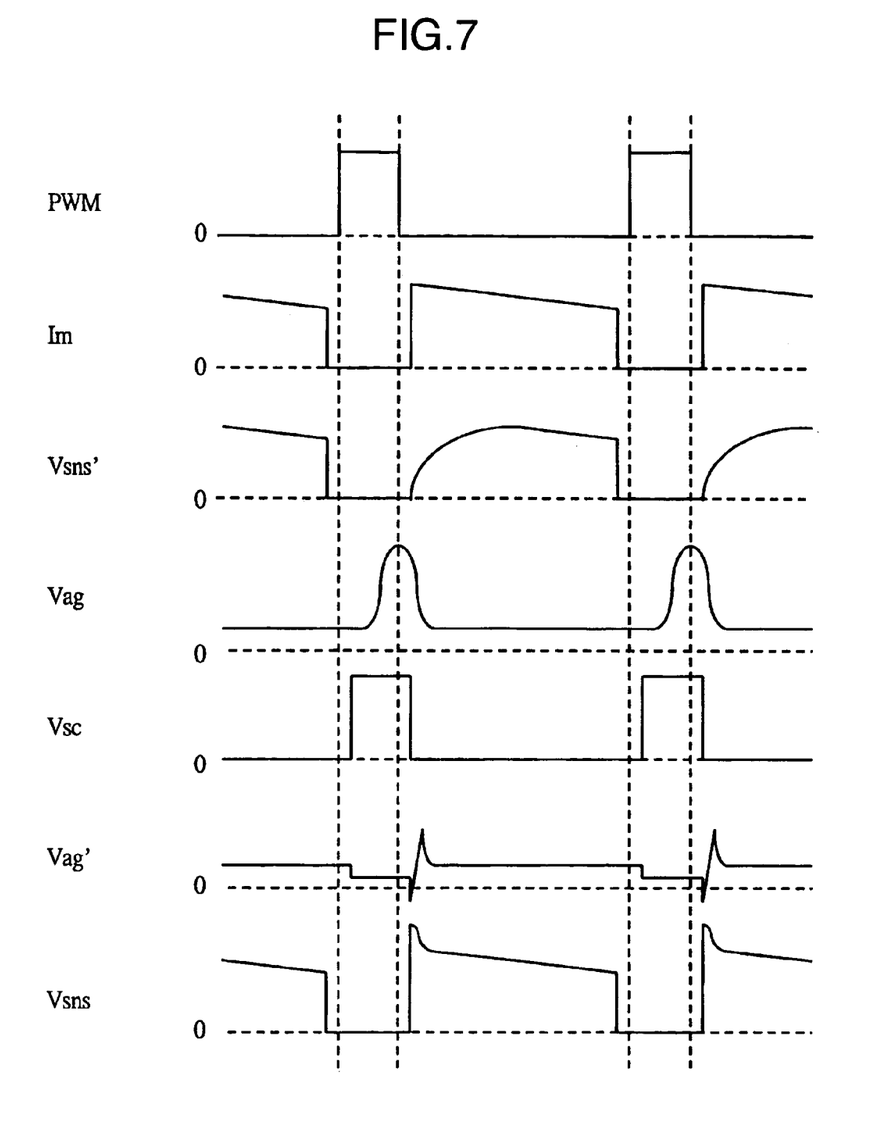
FIG. 7 is a timing chart showing the timing of the signals, for each of its parts, of the switching regulator of FIG. 6.

FIG. 6 is a circuit diagram showing an example of a switching regulator according to Embodiment 3 of the present invention, and FIG. 7 is a timing chart showing the timing of the signals, for each of its parts, of the switching regulator of FIG. 6.

In Embodiment 3, the buck-type regulator has a configuration wherein is disposed, in series with the inverter circuit NOT disposed between the gate of transistor Q2 and operational amplifier OP1 in FIG. 1 of the aforementioned Embodiment 1, a delay circuit DL (a timing setting means). Further, the order of inverter circuit NOT and delay circuit DL is of course irrelevant in this case.

According to this configuration, as shown in FIG. 7, it is possible to set the gate voltage Vsc of switch transistor Qsc with arbitrary timing. As a result, even if the timing of the voltage generated at gate voltage Vag is not synchronized with the gate voltage of transistor Q1, etc., it becomes possible for it to be subjected to clamping action with the desired timing.

Accordingly, in Embodiment 3, it is possible to obtain the same effect as in Embodiment 1, even in the case where an undefined potential is generated with any timing.

4. Embodiment 4

Figure 8:
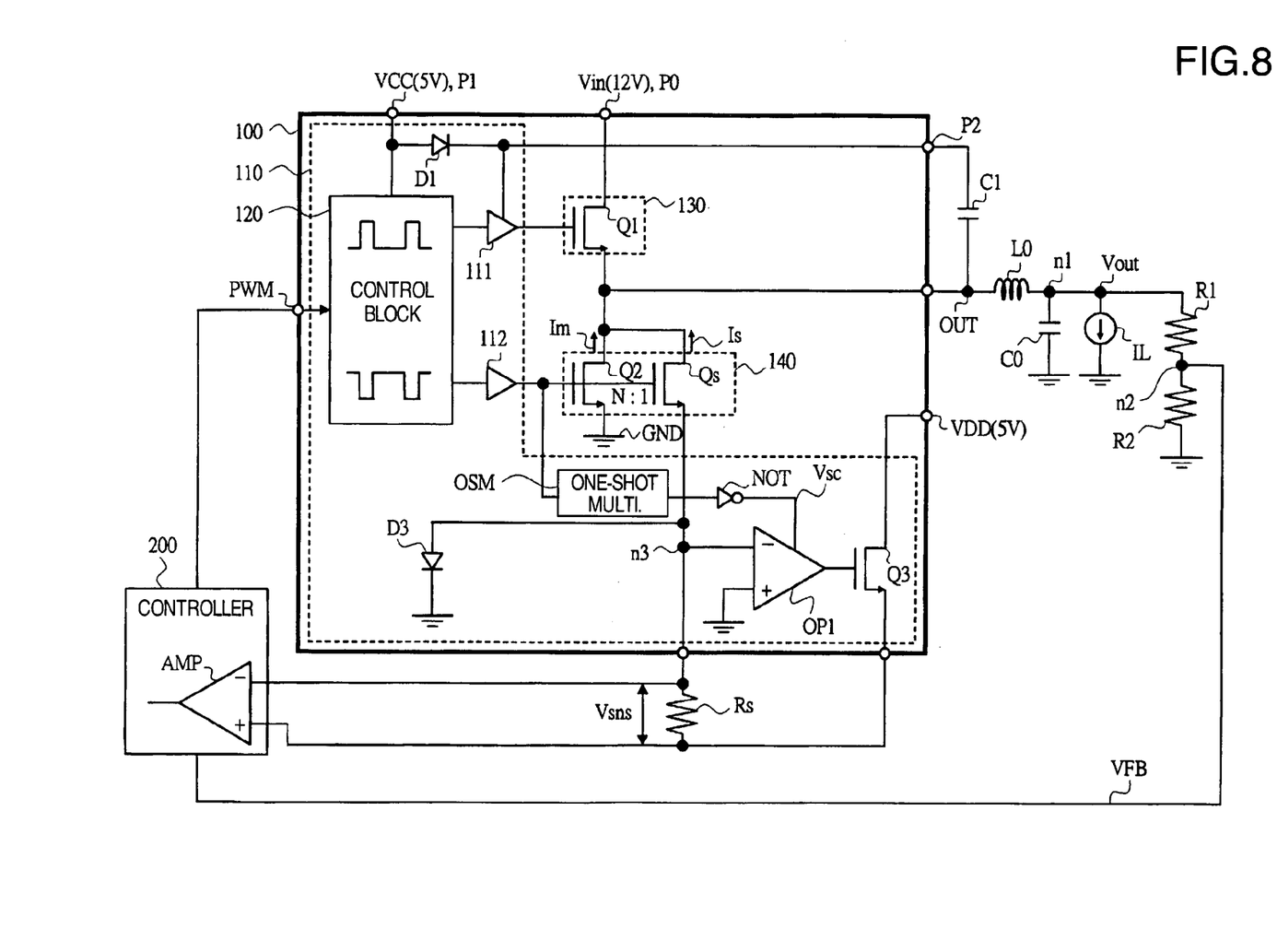
FIG. 8 is a circuit diagram showing an example of a switching regulator according to Embodiment 4 of the present invention.
Figure 9:
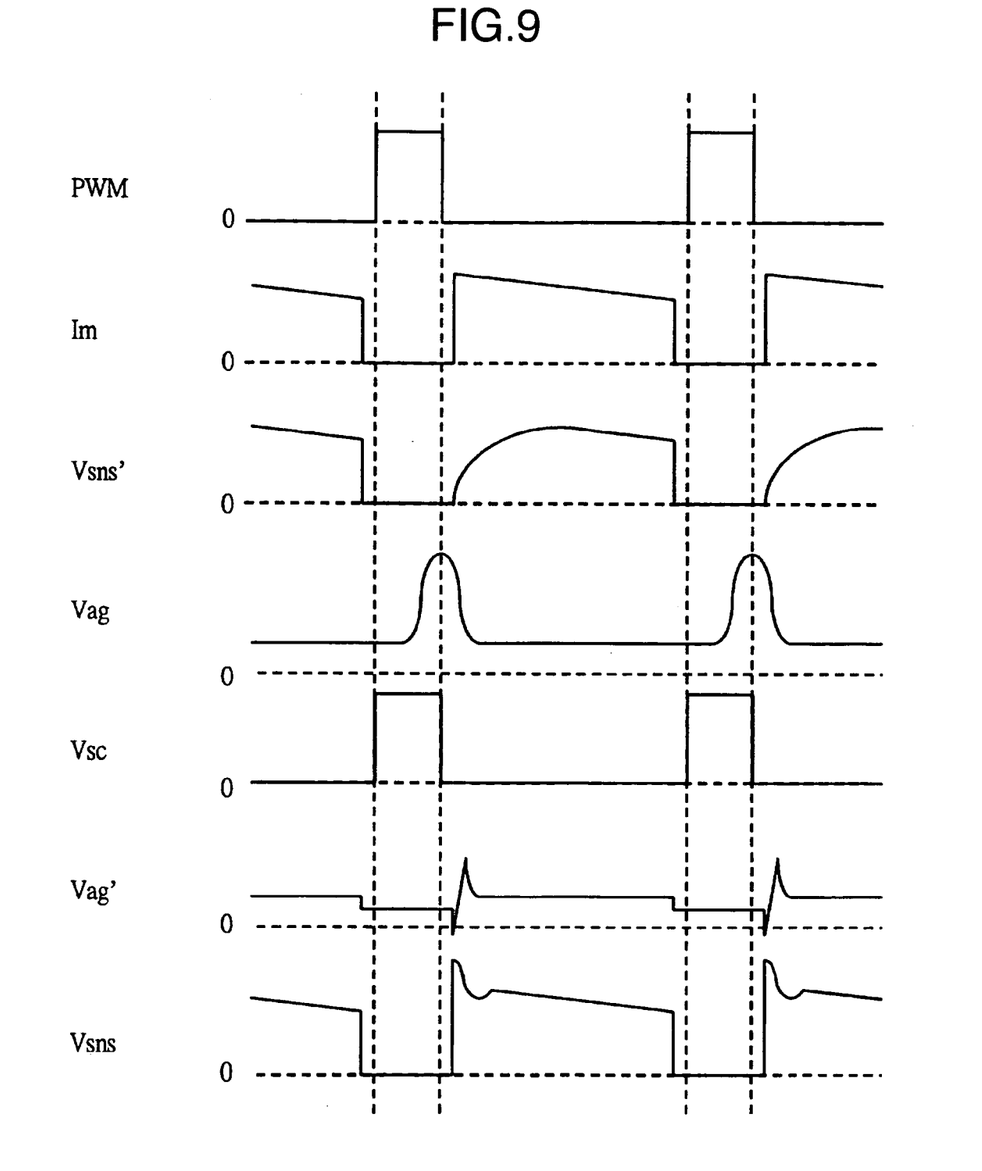
FIG. 9 is a timing chart showing the timing of the signals, for each of its parts, of the switching regulator of FIG. 8.

FIG. 8 is a circuit diagram showing an example of a switching regulator according to Embodiment 4 of the present invention, and FIG. 9 is a timing chart showing the timing of the signals, for each of its parts, of the switching regulator of FIG. 8.

In Embodiment 4, the buck-type switching regulator has a configuration wherein a one-shot multivibrator OSM (a signal width setting means) is chosen instead of the inverter circuit NOT disposed between the gate of transistor Q2 and operational amplifier OP1 in FIG. 1 of the aforementioned Embodiment 1.

According to this configuration, as shown in FIG. 9, it is possible to set the gate voltage of switch transistor Qsc to an arbitrary width. As a result, it becomes possible, even in the case where the timing of the jump of the voltage generated at gate voltage Vag has a width different from that of the gate voltage of transistor Q1, to suppress the voltage in a desired time width.

Consequently, according to Embodiment 4, irrespective of the time period during which an undefined potential is generated, it is possible to obtain the same effect as with Embodiment 1.

5. Embodiment 5

Figure 10:
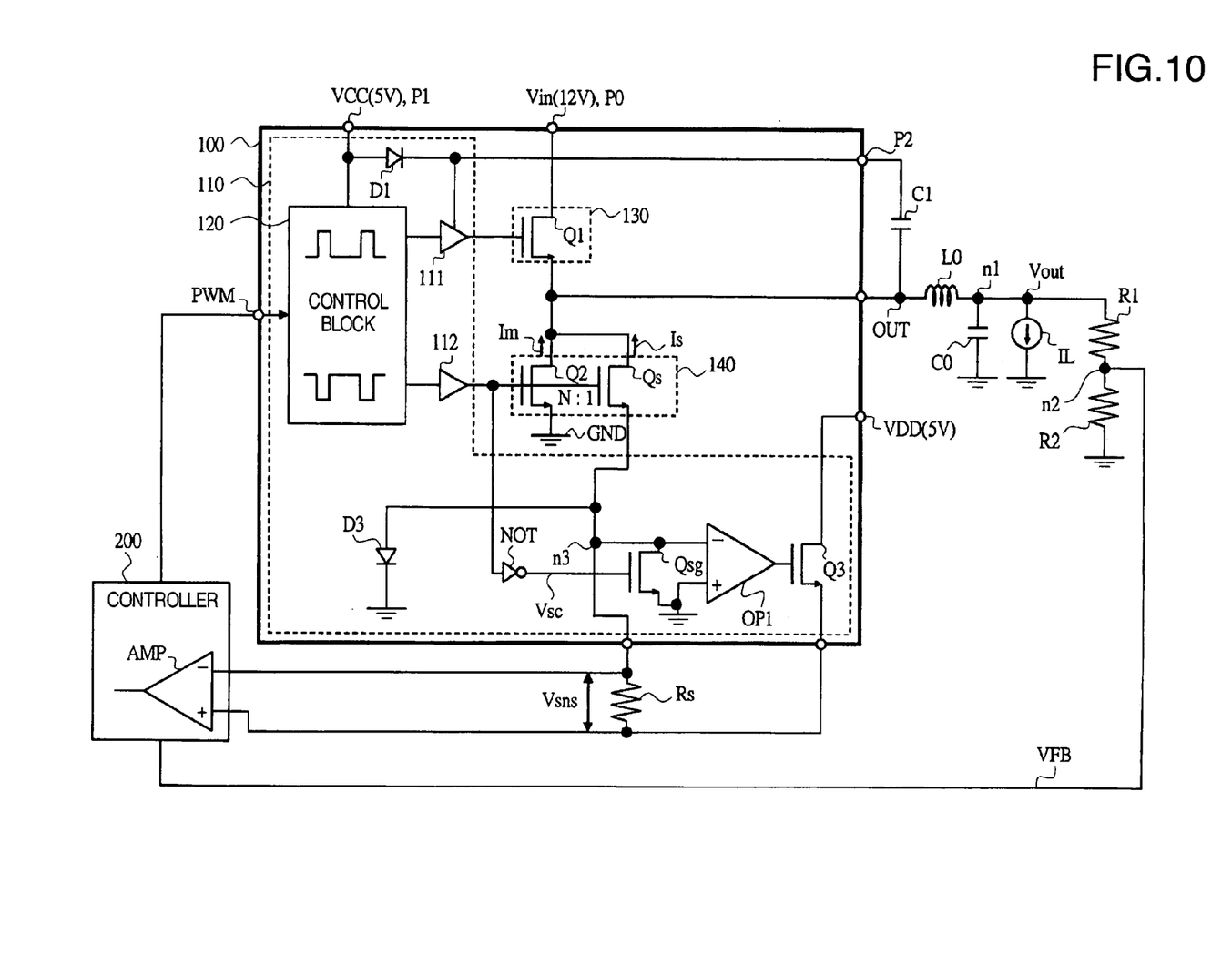
FIG. 10 is a circuit diagram showing an example of a switching regulator according to Embodiment 5 of the present invention.

FIG. 10 is a circuit diagram showing an example of a switching regulator according to Embodiment 5 of the present invention.

In Embodiment 5, the buck-type switching regulator is a regulator provided with a switching transistor Qsg (a second switch), between operational amplifier OP1 of FIG. 1 and the ground potential, instead of the voltage suppression circuit (diode D2, switching transistor Qsc) in FIG. 2 of the aforementioned Embodiment 1, and configured so as to drive the gate of switching transistor Qsg with switch voltage Vsc.

In this case, by providing switch transistor Qsg, it is possible to prevent the generation of a potential which is undefined when transistor Q1 is ON, i.e. when transistor Q2 is OFF.

Therefore, the settling time is shorter than for Embodiments 1 to 4, so it is possible to further improve the current sensing accuracy.

Also, in Embodiment 5, by enlarging the width of switching transistor Qsg, it is possible to further speed up the settling time. This method has the tendency, because there flows a sensing current in switching transistor Qsg, that the settling time becomes shorter, varying in inverse proportion to the voltage drop of the sensing current.

6. Embodiment 6

Figure 11:
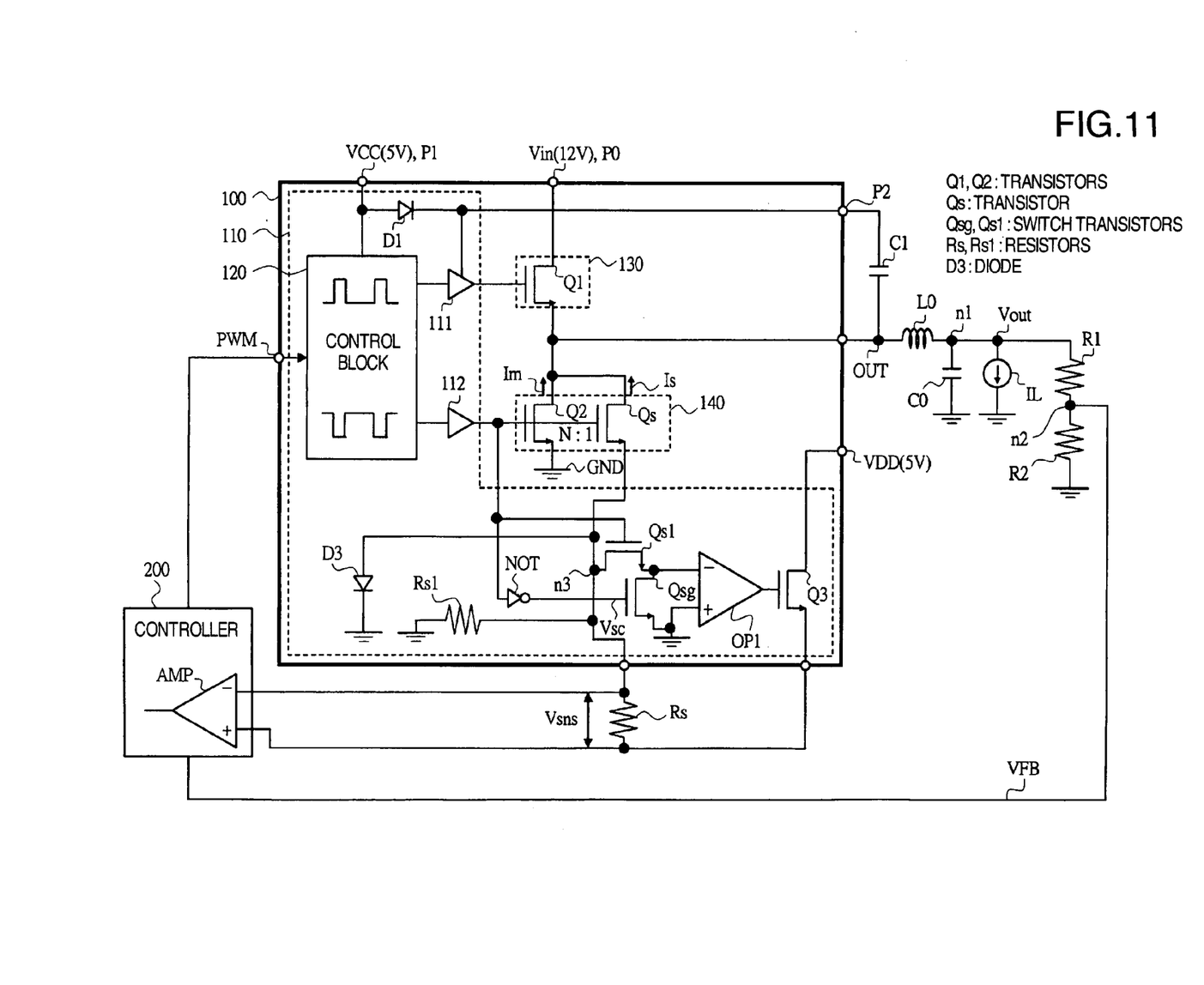
FIG. 11 is a circuit diagram showing an example of a switching regulator according to Embodiment 6 of the present invention.

FIG. 11 is a circuit diagram showing an example of a switching regulator according to Embodiment 6 of the present invention.

In the present Embodiment 6, the buck-type switching regulator has a configuration wherein a switching transistor Qs1 (a third switch) is provided between the drain of switching transistor Qsg in FIG. 10 of Embodiment 5 and the source of sensing transistor Qs, the gate of the concerned switching transistor Qs1 is connected respectively to the gates of transistors Q2, Qs, and wherein an inverter circuit NOT is inserted between the gates of transistors Q2, Qs and the gate of switching transistor Qsg, and a resistor Rs1 (a discharge resistor) is provided between node n3 and the ground potential. Further, although it is not specified in particular, it is desirable to use a resistor Rs1 having a resistance value of 100 Ω or higher.

Here, when transistor Q1 is ON, i.e. when transistor Q2 is off, the inverted input terminal of operational amplifier OP1 is forced to the ground potential, so an undefined potential is not generated, and due to the fact that this sensing current does not influence the inverted input terminal of operational amplifier OP1 because the sensing current flows in resistor Rs1, it is possible to obtain a minimum settling time and increased current sensing accuracy than those in Embodiments 1 to 5.

Also, in Embodiment 6, by disposing a switching transistor Qs1 and a resistor Rs1, since the current flowing when transistors Q2, Qs are ON is passed through resistor Rs1, it becomes possible to further suppress the influence due to switching, so the sensing accuracy and the responsiveness can be improved together.

7. Embodiment 7

Figure 12:
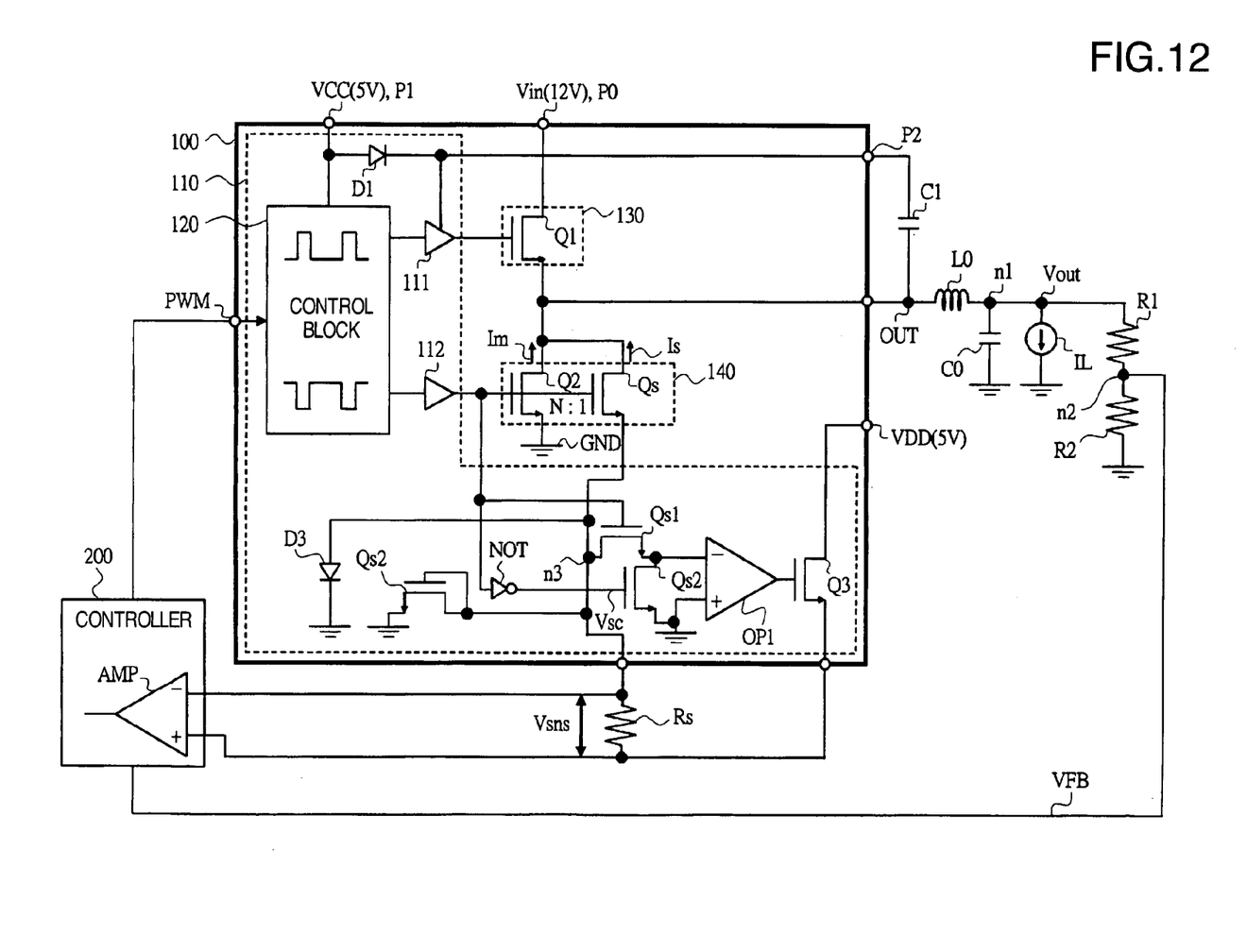
FIG. 12 is a circuit diagram showing an example of a switching regulator according to Embodiment 7 of the present invention.

FIG. 12 is a circuit diagram showing an example of a switching regulator according to Embodiment 7 of the present invention.

The present Embodiment 7 is an embodiment showing an example of a case where resistor Rs1 in FIG. 11 of Embodiment 6 has been configured by means of a MOS transistor Qs2.

Here, it is possible to operate in the same way as in Embodiment 6, suppress the influence due to switching, and improve together the sensing accuracy and the responsiveness. In this way, it is possible to obtain the same effect for a resistor other than a MOS transistor, even when changing to a MOS-FET (Metal Oxide Semiconductor—Field Effect Transistor), a diode, or some other element.

In the foregoing, the invention made by the present inventors has been specifically explained on the basis of the embodiments, but the present invention is not limited to the aforementioned embodiments, and it goes without saying that it is possible to make various modifications without departing from its substance.

For example, it is possible to use in combination the configurations shown in Embodiments 1 to 7, and it is also possible to freely change the control waveforms of the switches, to change the nodes controlling the voltage, and to change the voltage levels.

Also, in Embodiments 1 to 7, for the power supply driver module, cases were shown where MOSFETs were used as transistors Q1, Q2 (FIG. 1) and sensing transistor Qs (FIG. 1), but these transistors can also be configured with bipolar transistors, IGBTs (Insulated Gate Bipolar Transistors), or the like.

The invention claimed is:

1. A power supply driver circuit constituting a switched-mode power supply equipment controlling, by pulse-width modulation (PWM), switching of a power semiconductor device passing a current in an inductor, and outputting a voltage converted from an input voltage, comprising:
a current sensing semiconductor device in which drain terminals of the current sensing semiconductor device and said power semiconductor device, or collector terminals thereof, are coupled together, the same drive voltage being applied to control terminals thereof;
a current sensing resistor coupled to the source terminal or emitter terminal of said current sensing semiconductor device;
an operational amplifier circuit having a first input terminal connected to a first node which is a connection node connecting said current sensing resistor and said current sensing semiconductor device and a second terminal supplied with a voltage of the same potential as a source voltage or emitter voltage of said power semiconductor device; and
a current sensing circuit which has a feedback loop formed so that a pair of input terminals of said operational amplifier circuit have the same potential, and outputs a signal emanating in said current sensing resistor as a current sensing signal;
wherein a route passing the current in the current sensing circuit is ensured regardless of a switching state to make an undefined potential well defined.

2. A power supply driver circuit according to claim 1, wherein said power semiconductor device comprises two power semiconductor devices connected in series between a first and a second power supply voltage terminal, and said current sensing semiconductor device has its drain terminal or its collector terminal coupled to a drain or collector terminal of one of said two power semiconductor devices, which is connected to a low-potential side power supply voltage terminal.

3. A power supply driver circuit according to claim 1, wherein said current sensing circuit comprises a voltage down element and a first switch operable in response to a drive control signal, and said voltage down element and said first switch are connected in series between a gate terminal or a base terminal of a semiconductor device connected between an output node of said operational amplifier and the ground potential, and the ground potential.

4. A power supply driver circuit according to claim 1, comprising a second switch connected between one input terminal of said operational amplifier and the ground potential, and operating on the basis of a drive control signal, wherein said second switch, in a first state in which the potential of one input terminal of said operational amplifier becomes undefined due to the fact that said power semiconductor device is put in a switched state, maintains a node potential of a second state in which the potential is well defined.

5. A power supply driver circuit according to claim 1, comprising a third switch, connected between one input terminal of said operational amplifier and a node to which are connected the source terminal or emitter terminal of said current sensing semiconductor device and one terminal of said current sensing resistor and operating on the basis of a drive control signal, wherein said third switch, when said power semiconductor device is in a switched state, forces one input terminal of said operational amplifier to the ground potential.

6. A power supply driver circuit according to claim 4, comprising a third switch, connected between one input terminal of said operational amplifier and the source terminal or emitter terminal of said current sensing semiconductor device, and operating on the basis of a drive control signal, wherein when said power semiconductor device is in a switched state, one input terminal of said operational amplifier is forced to the ground potential.

7. A power supply driver circuit according to claim 1, comprising a discharge resistor connected between a node to which are connected the source terminal or the emitter terminal of said current sensing semiconductor device and one terminal of said current sensing resistor, and the ground potential, which discharges the current generated during a first state.

8. A power supply driver circuit according to claim 1, comprising an inverter circuit inverting the signal of the gate drive voltage or the base drive voltage of said power semiconductor device connected to the low potential side power supply voltage terminal and generating a drive control signal.

9. A power supply driver circuit according to claim 1, wherein the signal of the gate drive voltage or the base drive voltage of the power semiconductor device connected to the high potential side power supply voltage circuit is level-shifted to generate a drive control signal.

10. A power supply driver circuit according to claim 5, comprising a timing setting means for setting an arbitrary timing of the voltages of the drive control signals of said first to third switches.

11. A power supply driver circuit according to claim 5, comprising a signal width setting means for setting the time width of the drive control signals of said first to third switches to an arbitrary time.

* * * * *